(No Model.)
W. D. SARGENT.
BRAKE SHOE.
No. 523,084. Patented July 17, 1894.
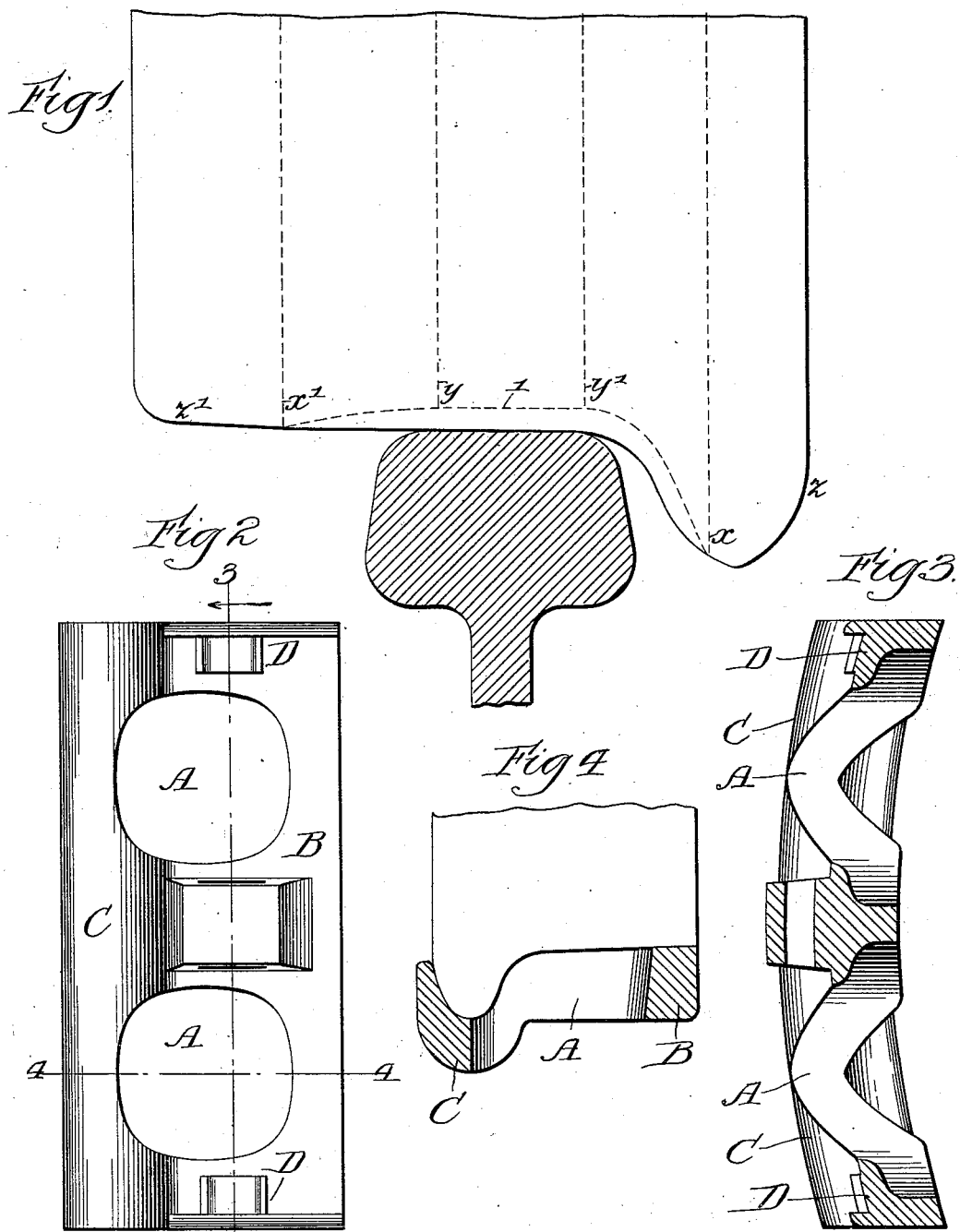
Witnesses
Wm. F. Henning
Jno. L. Condron
Inventor
William D. Sargent
by Raymond and Onnohundro
Attys.

UNITED STATES PATENT OFFICE.

WILLIAM DURHAM SARGENT, OF CHICAGO, ILLINOIS.

BRAKE-SHOE.

SPECIFICATION forming part of Letters Patent No. 523,084, dated July 17, 1894.

Application filed February 26, 1894. Serial No. 501,519. (No model.)

*To all whom it may concern:*

Be it known that I, WILLIAM DURHAM SARGENT, a citizen of the United States, residing in Chicago, in the county of Cook and State of Illinois, have invented certain new and useful Improvements in Brake-Shoes, of which the following is a full, clear, and exact description, reference being had to the accompanying drawings, forming a part of this specification.

This invention relates to improvements in that class of brake shoes that are designed to perform the function of "dressers" for the car wheels, the purpose being to have the brake shoe, while in the performance of its function as a brake, subserve the additional function of dressing or wearing such portions of the car wheel tread and flange as are not worn by contact with the rail.

The primary object of this invention is a brake shoe that shall dress or wear the flange and tread of the car wheel in such manner as to maintain the same in substantially its original contour in cross section.

Another primary object of my invention is a material reduction in the weight of brake shoes of this class, and a consequent substantial economy in the manufacture thereof, without loss or detriment to the braking qualities of the shoe and with the maximum durability, efficiency and accuracy as a dressing shoe.

These objects are attained by the devices illustrated in the accompanying drawings, in which—

Figure 1 represents a detail section of a portion of a car wheel and rail, with a diagrammatic illustration of the effect of wear upon the wheel. Fig. 2 represents a rear elevation of a brake shoe embodying my invention. Fig. 3 represents a central longitudinal section on the line 3—3 of Fig. 2; and Fig. 4 represents a transverse vertical section on the line 4—4 Fig. 3.

Similar letters of reference indicate the same parts in the several figures of the drawings.

Referring now to Fig. 1 in which is shown a substantially correct representation of the head of a standard rail and the tread of a standard car wheel, the full lines represent the outline of the parts as they appear when first entering service.

The curved dotted lines $l$ indicates the wear of the wheel tread and flange with approximate or theoretical correctness in the case of a wheel to which a dressing brake shoe is not applied. The area of maximum wear is from the dotted line $y$ to the dotted line $y'$ immediately over the head of the rail, and the areas of proportional wear are between the dotted lines $y$ and $x'$ and $y'$ and $x$ respectively, the points of minimum wear being at $x$ and $x'$ respectively on the flange and tread of the wheel, the degree of proportional wear gradually diminishing from the area of maximum wear to the point of minimum wear.

The office of the dressing brake shoe is to dress or wear away the portions of the wheel tread and flange that are not worn or are partially worn by contact with the rail, and the most perfect and satisfactory results to be obtained by the use of such a shoe is such a proportional wear of the wheel tread and flange as will maintain the periphery of the wheel in substantially the same contour throughout its life, so as to avoid the necessity for removing the wheels from the car truck and taking them to the shops to be turned and trued up by a lathe, which would otherwise be necessary.

The brake shoe illustrated in Figs. 2, 3 and 4, performs this office with accuracy and certainty, the wearing surface thereof opposed to the car wheel being accurately proportioned to wear with different degrees of effect upon the different portions of the car wheel and tread, so as to produce greater or less wear thereon, according to the wear to which the parts are subjected by contact with the rail, thus serving to maintain the contour of the tread and flange at all times substantially the same as that shown by the full line in Fig. 1. This brake shoe is of the ordinary or any desired dimensions and is of the type known as the flange brake shoe. The central portion of the body of the brake shoe is removed so as to form two or more recesses or openings A between the sides B and C, which latter are rigidly connected together by two or more bridges D. It will be noted that these openings are of such extent that the brake shoe has the full and maximum bearing upon the wheel between the points $x$ and $z$ and $x'$, $z'$ respectively, which indicate the areas of the car wheel which do not come in contact with the rail under any conditions of service and are therefore never worn by contact with the rail.

Between the points of minimum wear at $x$ on the crown of the flange and at $x'$ on the tread, the brake shoe has a proportionate bearing or contact with the wheel tread and flange, designed to simply even up or compensate for the proportionate wear of the wheel by contact with the rail. It will be observed, however, that with my brake shoe not only is the tread of the wheel dressed, but also the flange, which latter is always worn in practice by contact with the rails in turning curves, my shoe not only dresses the outside and crown of the flange but also dresses the inside and throat of the flange in approximately the proportion necessary to compensate for the wear thereof so as to maintain the outlines or contour of the flange as well as the tread of the wheel.

The brake shoe represented in the drawings illustrates the simplest and preferred embodiment of my invention, but obviously many modifications in the shape of the shoe as a whole and of the opening therein and of the bridges connecting the two main parts of the shoe may be made, without departing from the spirit of my invention so long as the essential feature thereof is retained, which results in the proportionate dressing of the tread and flange of the wheel to preserve and maintain the original outline or contour thereof. For instance, more bridges might be added only a portion of which bear upon the wheel, or the holes A might be spanned by a web at the back of the shoe, which would result in converting such holes into recesses in the inner or working face of the shoe. Then again, either with webs or bridges connecting the main portions B and C of the shoe, the bridges may be so cut away on the inner face of the shoe as to have no bearing on the wheel over the area of maximum wear, although a slight wear of such area is preferable because in such case the dressing effect of the shoe would be almost identical with that of a lathe when the wheel is being turned and trued. All such modifications, however, are very obvious ones and would be within the scope of my invention, and many other changes of a like character will readily suggest themselves to one skilled in the art to which my invention appertains.

Another feature of great practical importance is the reduction in the weight of a shoe of this character which is invariably made of steel or iron, which reduction not only avoids the liability of the shoe to tilt or cant in service, which results in uneven wear of both the shoe and wheel, but also effects a substantial economy in the cost of manufacture of the shoe as it saves a large amount of metal which has heretofore been useless in the shoe and had to be discarded as waste or scrap when the shoe was worn out, the saving thus effected being from a third to a half of the total amount of metal heretofore necessary in this class of shoes.

I am aware that prior to my invention dressing brake shoes have been constructed having recesses in the face thereof over the area of maximum wear of the car wheels, and also with wearing faces designed to proportionately wear the tread of the car wheel, but I am not aware of any brake shoe prior to my invention in which the wearing surface of the shoe is proportioned to the wear on the entire tread and flange of the wheel, including the area of wear upon the throat and crown of the flange.

Having described my invention, what I claim as new therein, and desire to secure by Letters Patent, is—

1. A brake shoe having continuous wearing surfaces to bear upon those portions of the wheel which do not make contact with the rail, that portion of the shoe between such continuous wearing surfaces being recessed or cut out so as to leave a reduced and substantially uniform wearing surface over the area of maximum wear of the rail upon the wheel, approximately from $y$ to $y'$, and gradually increasing wearing surfaces between said reduced portion and the said continuous wearing surfaces, approximately from $y$ to $x'$ and $y'$ to $x$, substantially as and for the purpose described.

2. A brake shoe adapted to work upon both the tread and flange of a car wheel, provided with irregularly shaped recesses or openings extending between the points of minimum wear of the rail upon the wheel, approximately from $x$ to $x'$, so as to leave continuous wearing surfaces beyond or at each side of said openings, a reduced and substantially uniform wearing surface over the area of maximum wear of the rail upon the wheel, and gradually increasing wearing surfaces between such reduced portion and the continuous side portions, substantially as described.

3. A brake shoe having continuous wearing surfaces to bear upon those portions of the wheel which do not make contact with the rail, that portion of the shoe between such continuous wearing surfaces being recessed or cut out so as to leave a reduced and substantially uniform surface over the area of maximum wear of the rail upon the wheel, approximately from $y$ to $y'$, and a gradually increasing wearing surface between said reduced portion and the continuous wearing surface at the inner edge of the shoe, approximately from $y'$ to $x$, substantially as and for the purpose described.

WILLIAM DURHAM SARGENT.

Witnesses:
CHAS. B. BOWEN,
JNO. L. CONDRON.